United States Patent
Lang et al.

[11] Patent Number: 5,887,893
[45] Date of Patent: Mar. 30, 1999

[54] NECKED AIRBAG INFLATOR

[75] Inventors: Gregory J. Lang, South Ogden; L. John Pierotti, Huntsville, both of Utah

[73] Assignee: Autoliv ASP, Inc., Ogden, Utah

[21] Appl. No.: 754,643

[22] Filed: Nov. 21, 1996

[51] Int. Cl.[6] .................... B60R 21/28; C06D 5/06
[52] U.S. Cl. ................ 280/741; 280/742; 102/289
[58] Field of Search .................. 280/741, 742, 280/743.1; 102/289

[56] References Cited

U.S. PATENT DOCUMENTS

| | | | |
|---|---|---|---|
| 5,000,479 | 3/1991 | Werner et al. | 280/741 |
| 5,536,040 | 7/1996 | Cuevas et al. | 280/741 X |
| 5,605,349 | 2/1997 | Childree | 280/741 |
| 5,609,359 | 3/1997 | Johnson et al. | 280/742 X |
| 5,623,116 | 4/1997 | Hamilton et al. | 280/742 X |
| 5,669,629 | 9/1997 | Rink | 280/741 |
| 5,738,372 | 4/1998 | Lowe et al. | 280/741 X |
| 5,763,817 | 6/1998 | Renfroe et al. | 280/742 X |
| 5,788,275 | 8/1998 | Butt et al. | 280/741 |

*Primary Examiner*—Peter A. Nelson
*Attorney, Agent, or Firm*—Sally J. Brown

[57] ABSTRACT

The cost and ease of manufacture and assembly of airbag inflators is enhanced by welding sections of the inflator housing together in a recessed portion of the side wall of such housing. By providing a portion of the housing side wall which is recessed sufficiently that it contains all of the weld flashing produced during the welding operation it is possible to eliminate the machining operation for removing such flashing which, otherwise, could be required to provide external dimensions within specification.

11 Claims, 3 Drawing Sheets

FIG. I

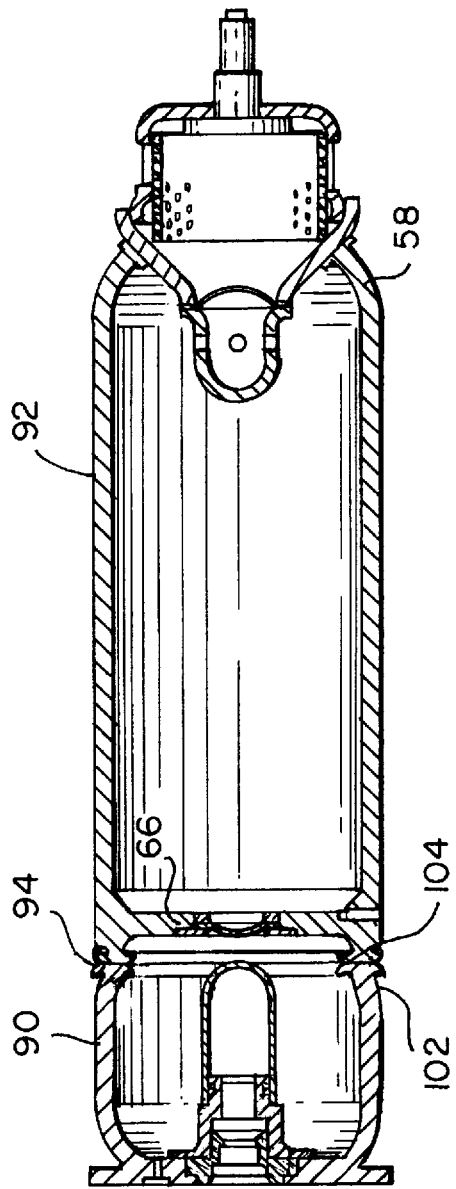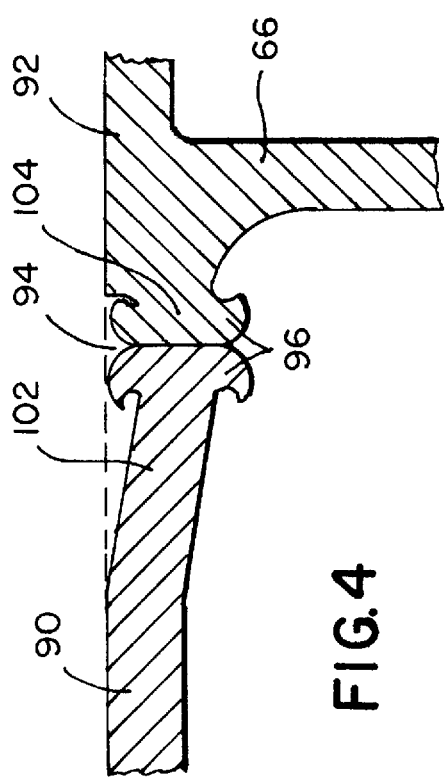

NECKED AIRBAG INFLATOR

BACKGROUND OF THE INVENTION

FIELD OF THE INVENTION

Passive restraint systems of the type popularly referred to as airbag systems are increasingly provided in modern motor vehicles because of their demonstrated ability to diminish the extent of injury to vehicle occupants in the event of a vehicle collision. These airbag systems typically rely on the rapid release of a gas into an inflatable cushion, or airbag, when a collision is sensed by a crash sensor. The airbag opens into a space located between the normal position of a vehicle occupant and portions of the vehicle passenger chamber into which the vehicle occupant might be propelled and thereby injured but for the presence of the airbag.

The airbag assembly typically includes a gas generator, often referred to as an inflator, an airbag or cushion, and a housing, often referred to as a module. The module mounts the folded airbag and the inflator in positions whereby the gas generated by the inflator is discharged or directed into an opening provided in the airbag, thereby causing the airbag to inflate and expand into its intended inflated location. The module also provides secure storage for the airbag and inflator. Additionally, it provides means for mounting the assembly in a sturdy and secure location on the vehicle.

Several different types of inflators are used in airbag assemblies. A relatively simple design merely relies on the rapid release of a compressed gas. This design requires a fairly sturdy compressed gas container which results in a relatively heavy assembly. Other inflators rely on the combustion of solid pyrotechnic materials to provide the inflation gas. Still others, known as hybrid inflators, rely on solid pyrotechnic materials to provide a heated gas which is then mixed with a stored compressed gas to provide the inflation gas. Recently, airbag inflators which rely on the combustion of fluid fuels have been introduced. These inflators rely on the combustion, or exothermic dissociation, of a fluid fuel to create a heated gas which usually is then mixed with a stored compressed gas to provide the inflation gas.

Many of the modules, particularly those for use in front of front seat passengers of automobiles, provide a port through which an elongated inflator is inserted and mounted. The inflators used in such modules are designed to be inserted through such port and be firmly mounted in their intended position within the module. The inflators which require multiple chambers along their length, such as the hybrid and fluid fuel inflators which provide a first combustion chamber for combusting the fuel and a second gas storage chamber for containing a compressed inert gas to be mixed with the combustion gases produced in the combustion chamber, have typically been manufactured by welding two cylindrical sections together. The weld creates a relatively uneven weld seam, which, depending on the welding technique used, can be significantly different from the otherwise relatively uniform cross section of the joined sections. Inertial welding is the prevalent welding technique for such joinder used by some manufacturers. The otherwise uniform cross-section is significantly upset when inertial welding is used to join the cylindrical sections. When such inflators are to be inserted into a module through a port the irregularities contributed by the weld seam must be removed to facilitate such insertion. Typically, such removal requires machining of the exterior circumference of the inflator housing. The machining not only adds to the cost of manufacturing the inflator, it can also result in the walls of the inflator having a variable thickness, especially when the two sections are misaligned during the welding process. If the variation in thickness is excessive, it can result in the item being rejected to scrap. Moreover, machining of the inflator can result in ridges which also will interfere with the smooth installation of the inflator in the module.

SUMMARY OF THE INVENTION

An object of the present invention is to provide an improved inflator which is easier to manufacture.

A further object of this invention is to provide an improved inflator can consistently be readily assembled into the airbag module.

Another object of the invention is to provide an improved inflator which costs less to manufacture.

These and other objectives of the invention have been achieved by providing for the weld joining the two segments at a necked down location whereby any irregularity in the inflator cross section resulting from the welding operation, referred to hereinafter as weld flashing, or simply flashing, is fully located within the bounds of the outermost dimensions of the cross section of the elongated portion of the inflator. Such a necked down portion provides a recessed groove which fully contains the weld flashing beneath the surface otherwise defined by the outer wall of the elongated portion of the inflator. In such position the flashing does not interfere with the normal insertion of the inflator into the module. Therefore, it is not necessary to remove the flashing and the otherwise required machining operation can be eliminated.

BRIEF DESCRIPTION OF THE DRAWINGS

FIG. 3 is a side view, in section, of an inflator embodying the present invention.

FIG. 4 is an expanded sectional view of the weld seam and adjacent components in the inventive inflator of FIG. 3.

DETAILED DESCRIPTION OF THE INVENTION

Field of the Invention

Figure 1:
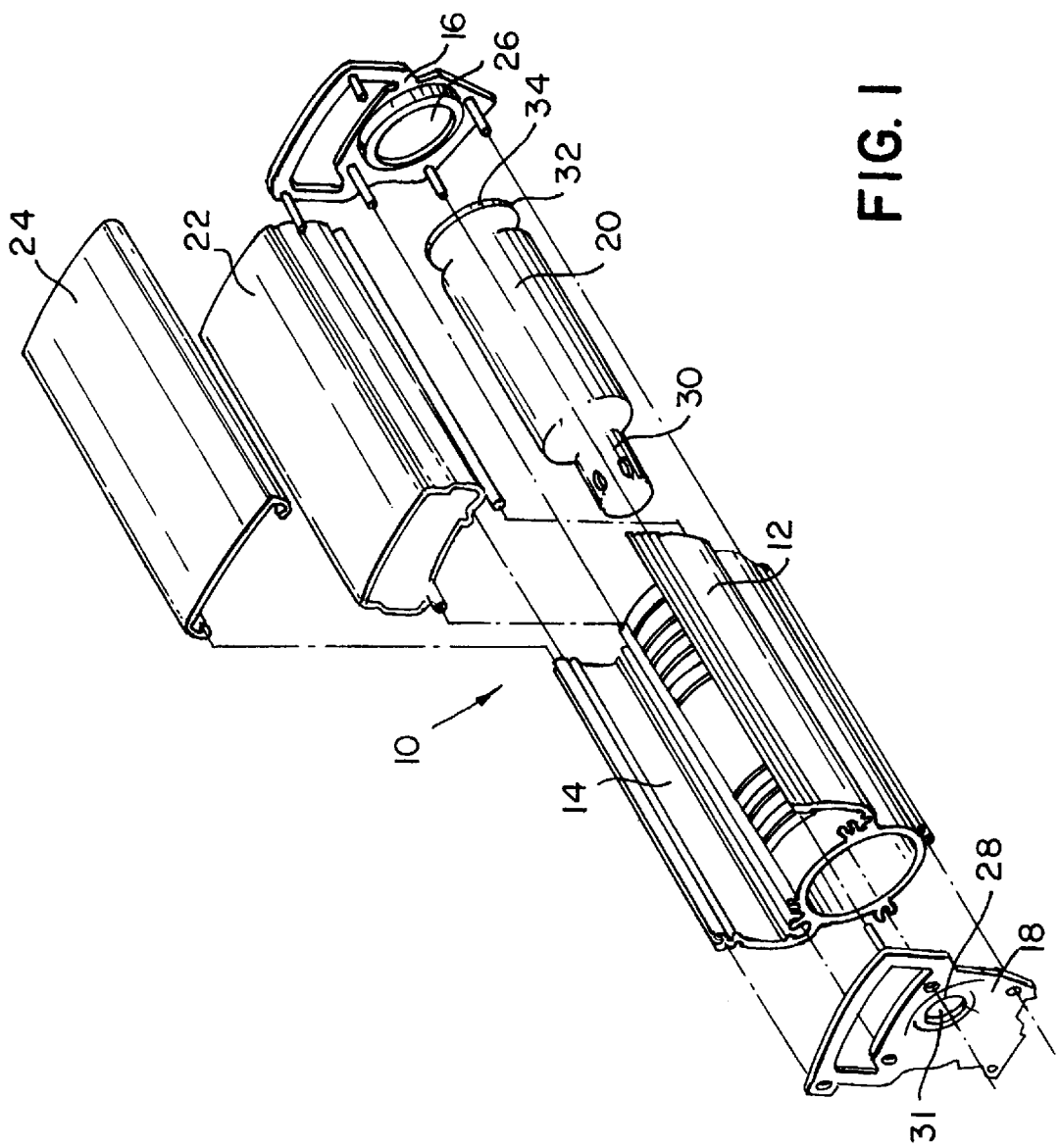
FIG. 1 is an exploded view of an airbag system assembly.

A typical airbag assembly of the type in which the present inflator is used is illustrated in FIG. 1. The airbag assembly 10 includes a module, or housing, 12 comprising an extruded side wall 14 extending between a first end wall 16 and a second end wall 18. An inflator 20 fits within the bottom portion of the module 12. A folded airbag, or cushion 22, is mounted in the top portion of the module 12 with an opening into its interior located to receive the gas generated by the inflator. A releasable dust cover 24 overlies the folded airbag 22 to protect it from damage and to minimize the access of dust, insects, etc. to the components of the assembly. An opening 26 is provided in the first end wall 16 through which the inflator can be inserted, and, if necessary, withdrawn. A nesting structure 28 is provided in the second end wall 18 to align and mount the inserted end 30 of the inflator. Any of several structures can be provided to hold the inflator in its intended position within the module, for instance, a stud provided at the inserted end of the inflator can be inserted through a port 31 provided in the second end wall 18 and then be held in place by a nut or other attachment device while a flange 34 at the following end 32 of the inflator mates with the exterior of the first end wall 16.

Figure 2:
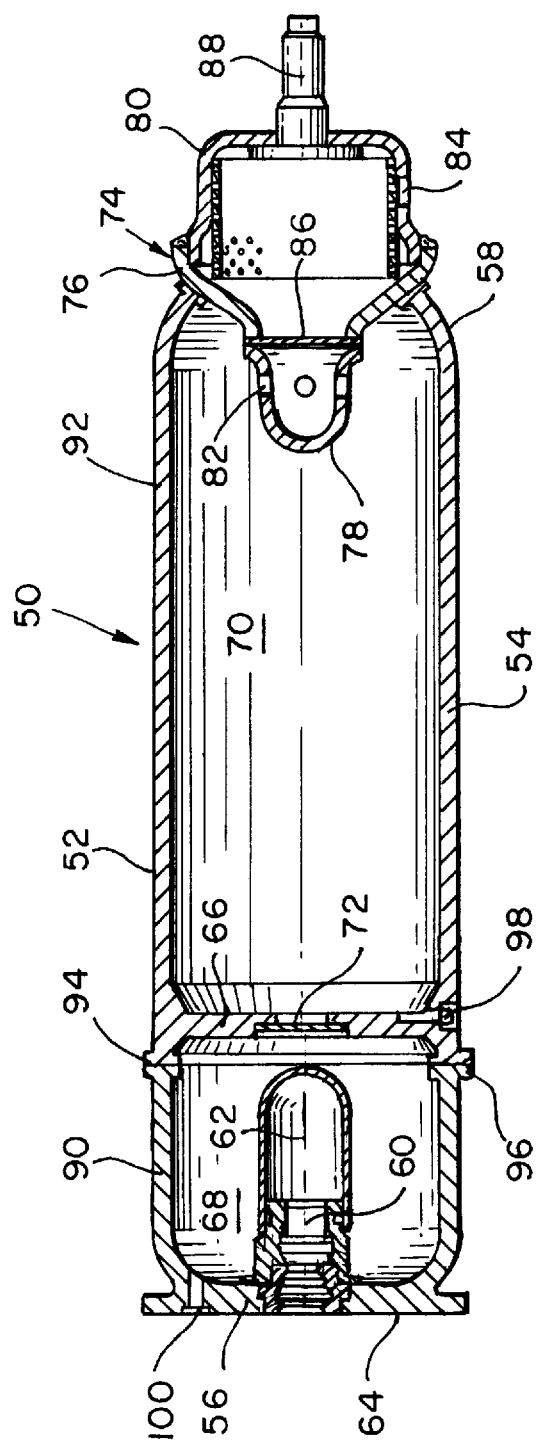
FIG. 2 is a side view, in section, of a prior art inflator.

A typical prior art inflator of the type to which the present invention applies is illustrated in FIG. 2. The inflator 50 includes a housing 52 comprising a side wall 54 extending from a first end 56 to a second end 58. An assembly, which includes an igniter 60 and a fuel reservoir 62, is mounted through the structure 64 closing the first end 56. A bulkhead 66 is provided spanning the interior of the housing and dividing it into two chambers, a combustion chamber 68 and an auxiliary gas chamber 70. The bulkhead includes an opening means 72 which can either be a rupture disc, a weakened portion of the bulkhead or a similar structure. The side wall 54 is welded to a diffuser assembly 74 provided at the second end 58 of the inflator. The diffuser assembly includes a conical adapter 76 extending between a first cap 78 mounted facing the interior of the inflator and a second cap 80. The first cap 78 includes a first plurality of ports 82 communicating with the auxiliary gas chamber 70. The second cap 80 includes a second plurality of ports 84 communicating with the exterior of the inflator. An openable means 86, such as a rupture disc, is provided between the two pluralities of ports. The second cap 80 also includes a mounting stud 88 provided to extend through a port provided on an end wall of the airbag module and be attached thereto, thereby aligning and mounting the inflator in the module.

The inflator is fabricated by providing the side wall of the housing in two sections, the first section 90, also referred to as the combustion chamber section, extending to the first end 56 of the housing, while the second section 92, also referred to as the auxiliary gas chamber section, extends to the second end 58 of the housing. These sections can be formed by a variety of methods, we have preferred to use impact forming, such as forging and stamping methods. Each of the two sections has an essentially equivalent external cross sectional shape or diameter for a portion of its length, which shape or diameter defines the inflators cross section for insertion into an opening, such as the opening 26 in the module housing 12 illustrated in FIG. 1. The essentially identical cross sectional shape or diameter shall for convenience be referred to hereinafter as the normal shape or normal diameter of the side wall. It should be recognized that the normal shape or normal diameter is not necessarily the shape or diameter of the inflator having the largest dimensions, since the inflator may include portions which are not intended to be inserted through the opening, such as the flange 34 which is not intended to be inserted through the opening 26. The two sections are coaxially joined by a welding process which forms a weld seam 94. Depending on the type of welding used, a greater or lesser portion of the side wall material melted during the welding process is displaced from its original location and solidified in a displaced location 96; such material is referred to herein as weld flashing or, simply, flashing. It has been the applicants preferred practice to weld the two sections together by inertial welding, which method produces a significant amount of flashing. As illustrated in FIG. 2, the flashing forms on both the interior and exterior of the weld seam surface. The flashing formed on the interior does not present a problem. The flashing formed on the exterior surface creates problems when the inflator is inserted through the opening 26 into the module 12, and with material handling equipment during the manufacturing process. For these reasons the flashing is removed. The igniter 60 and fuel reservoir 62 assembly can be inserted and attached to the first section 90 either before or after the two sections are welded together, dependent, in part, on whether the assembly is designed to be mounted from the interior or the exterior of the first section. The diffuser assembly 74 is welded to the second section 92 either before or after the two sections are welded together. Once the diffuser assembly 74, the igniter 60 and fuel reservoir 62 assembly and the two sections 90, 92 of the side wall 52 are assembled, a compressed auxiliary gas such as nitrogen, carbon dioxide, helium, argon or xenon, is charged to the auxiliary gas chamber 70 through fill port 98. An oxidizing agent, such as a compressed oxygen containing gas or nitrous oxide ($N_2O$), is added to the combustion chamber 68 through fill port 100.

The present invention is directed to elimination of the need to remove the flashing 96 formed when the two sections 90, 92 of the side wall 52 are welded together, and, therefore, elimination of the shearing or machining step previously required to remove such flashing. While this removal step can be accomplished by a shearing, cutting or grinding technique, we have removed it by turning the inflator in a lathe. The heat cycle to which metal is subjected during a welding operation causes the metal, particularly steel, to harden, resulting in the tools used during the turning operation to have a shorter effective life than had the metal not hardened. Therefor, the machining processing step not only requires equipment and operator time, it also requires significant downtime for retooling. Additionally, the welding step can result in the two sections being slightly misaligned when joined. Machining of a slightly misaligned inflator side wall results in the side wall having a non-uniform thickness since more of the wall will be removed from one section than the other. In severe cases, the resulting non-uniform thickness of the side wall requires that the inflator be rejected to scrap. By eliminating the need for the machining step the manufacturing process is simplified, the manufacturing costs are reduced and a more uniform inflator product is provided.

An inflator according to the present invention is illustrated in FIGS. 3 and 4. The same item numbers as are used in FIG. 2 are used to identify equivalent components in FIGS. 3 and 4. The principal difference between the illustrated inflators is found in the configuration of the side wall in the sections 90, 92 directly adjacent to the weld seam 94. The side wall is necked, i.e. it has an exterior dimension transverse its longitudinal axis which is reduced, at 102, 104 directly adjacent the weld seam 94. The exterior dimension of the side wall at the weld seam is reduced sufficiently that it exceeds the distance the flashing produced during the welding step extends outwardly about the weld seam. In other words, the side wall is necked to a sufficiently reduced width, or diameter, that the flashing produced during the welding step is fully contained within the locus defined by the normal shape or normal diameter of the side wall sections 90, 92 and depicted as a dotted line in FIG. 4. It should be apparent that the recess is provided by necking portions 102, 104 of each of the side wall sections 90, 92 adjacent to the ends thereof which are to be joined in the welding step. Such can be accomplished by preparing each section as they were previously prepared by impact forming and then either machining, as in a lathe, or pressing, as in a swaging press, to form the necked down portions.

By recessing the flashing beneath the locus defined by the normal shape or normal diameter of the inflator side wall, which is the maximum diameter or external dimension presented to openings through which the inflator is inserted, the flashing is effectively removed from a position in which it interferes with the insertion operation.

As shown in FIGS. 3 and 4, the weld seam 94 and the necked portions 102, 104 of the side wall are adjacent the bulkhead 66, which is provided as a unitary structure with the second section 92 of the side wall 52. If desired, the weld seam 94 and the necked portions 102, 104 of the side wall could be provided between the bulkhead 66 and the second end 58 of the inflator, i.e. the end from which the generated gases are discharged.

The invention can be applied to inflators constructed of any material which is satisfactory for use as an inflator and can be joined by a welding or similar technique involving partial melting and resolidification. While it has primarily been used with inflators having housings fabricated of metals, such as aluminum, carbon steel and stainless steel, the invention could also be used with housings fabricated from resins.

The invention can be beneficial when used with inflator fabrication techniques which use any of the usual welding techniques to join the two side wall sections 90 and 92. We prefer to accomplish welding by an inertial welding process, however other welding processes, such as the MIG, cold wire TIG and metal transfer processes, could be used. All of the processes produce some degree of weld flashing and surface discontinuity at the weld seam. While the amount of weld flashing in most of the other processes is generally not as extensive as that produced by inertial welding, such weld flashing can be sufficient to disrupt the smooth insertion of the inflator into the airbag module in the absence of the present invention. It is generally preferable that the weld be aligned tube-to-tube, meaning that the weld occurs perpendicular to the longitudinal axis of the two tubes, or sections, being joined.

The weld flashing will usually be sufficiently recessed if the side wall is necked or reduced by an amount in the range of 0.040 to 0.160 inch. In other words, when the side wall has a circular cross section, the diameter of the side wall at the weld seam should be 0.080 to 0.320 inches less than the normal diameter of the side wall.

The invention is particularly applicable to the fabrication of inflators having two chambers separated by a bulkhead 66 as shown in FIGS. 2, 3 and 4. The invention can also be used with inflators having a single chamber, or with inflators having three or more chambers separated by two or more bulkheads.

The assembly illustrated in FIG. 1 is intended for use in front of the passenger position of the front seat. The inventive inflators can also be used in airbag assemblies intended to be located in other positions on the vehicle, such as in assemblies intended to provide protection from side impacts.

A cost of $0.12 per inflator has been quoted to incorporate the disclosed weld containing recess into the prior inflator design. The cost of removing weld flashing from inflator housings by machining is approximately $0.34 per inflator in labor and tool replacement costs plus set up costs in excess of $150,000 plus the cost of the increased number of rejects due to insufficient wall thickness resulting from the machining operation. Accordingly, the present invention permits savings in excess of $0.24 per inflator. It is believed that the invention will have applicability to in excess of five million inflators per year, resulting in annual savings attributable to the present invention in excess of 1.2 million dollars per year.

The descriptions and illustrations are provided to fully enable one of ordinary skill to practice our invention and are not intended to limit the scope of the invention. The following claims should be looked to for definition of our invention and its scope.

We claim:

1. In an inflator for use in an airbag passive restraint system, comprising:

(a) a housing having a side wall extending from a first end to a second end, said side wall including a welded joint between a first section which extends from said joint toward said first end and a second section which extends from said joint toward said second end, each of said first section and said second section defining a substantially equivalent external shape which extends a portion of the distance between said first end and said second end, (b) an igniter mounted at said first end, (c) a gas generating material stored within said housing;

the improvement comprising;

a recessed portion of said side wall located adjacent said welded joint and recessed a sufficient distance that weld flashing produced during the welding process does not extend to the substantially equivalent external shape defined by said side wall.

2. The inflator of claim 1, wherein said recessed portion contains weld flashing produced during the welding of said welded joint.

3. The inflator of claim 2, wherein said weld flashing is produced by the inertial welding of said welded joint.

4. The inflator of claim 1, wherein said recessed portion is located in proximity to a wall which separates two chambers within said housing.

5. The inflator of claim 1, wherein said substantially equivalent external shape is the largest external cross-section shape defined by at least one of said first section and said second section.

6. The inflator of claim 1, wherein said sufficient distance is about 0.040 inch to 0.160 inch.

7. In an airbag assembly comprising:

(a) an inflator having a housing comprising an elongated side wall formed from two sections joined at a weld seam, each of said two sections having a substantially equivalent exterior cross section extending a portion of its length, (b) an airbag, and (c) a module having an opening through which said inflator is inserted to be mounted in a position in said module where gas produced by said inflator will be directed into said airbag, the improvement comprising:

said weld seam being located in a portion of said side wall which is recessed from said substantially equivalent exterior cross section a recessed distance which is greater than the distance flashing produced by such weld protrudes from the recessed portion of the side wall, whereby said inflator can be inserted through said opening without interference caused by said flashing.

8. The airbag assembly of claim 7, wherein said weld seam is located in proximity to a wall separating two chambers within said housing.

9. The airbag assembly of claim 7, wherein said recessed distance is about 0.040 inch to 0.160 inch.

10. The airbag assembly of claim 7, wherein one of said first end or said second end includes a structure which has at least one external cross-sectional dimension which is greater than the corresponding dimension of said substantially equivalent exterior cross section.

11. The airbag assembly of claim 10, wherein said structure comprises a flange which is mounted to said module adjacent to said opening.

* * * * *